(12) United States Patent
Graunke

(10) Patent No.: US 6,804,355 B1
(45) Date of Patent: Oct. 12, 2004

(54) BLOCK CIPHER FOR SMALL SELECTABLE BLOCK SIZES

(75) Inventor: Gary L. Graunke, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/478,933

(22) Filed: Jan. 6, 2000

(51) Int. Cl.[7] .................................................. H04K 1/06
(52) U.S. Cl. ........................................ 380/37; 713/194
(58) Field of Search ........................... 380/37; 713/194, 713/168, 189, 193, 200, 155

(56) References Cited

U.S. PATENT DOCUMENTS

| | | | | |
|---|---|---|---|---|
| 5,835,600 A | * | 11/1998 | Rivest | ......................... 380/44 |
| 5,949,884 A | * | 9/1999 | Adams et al. | ................ 380/29 |
| 6,628,786 B1 | * | 9/2003 | Dole | ........................... 380/44 |

OTHER PUBLICATIONS

Savard, A Cryptographic Conpendium, 1999, pp. 1–4.*
L. Knudsen, DEAL—A 128–bit Block Cipher, submitted as an AES candidate (see http://www.nist.gov/aes), http://www/ii/uib/no/~larsr/papers/deal.ps, Aug. 20–22, 1998.
M. Luby and C. Rackoff, "How to Construct Pseudorandom Permutations from Pseudorandom Functions," SIAM J. on Computing, vol. 17, 1988, pp. 373–386.
M. Matsui, "New Structure of Block Ciphers with Provable Security against Differential and Linear Cryptanalysis," Fast Software Encryption III, Feb. 1996, pp. 205–218, Springer Verlag Lecture Notes in Computer Science, vol. 1039.
P. Rogaway and D. Coppersmith, "A Software–Optimized Encryption Algorithm," Journal of Cryptography, vol. 11, No. 4, Autumn 1998, pp. 273–287.

* cited by examiner

*Primary Examiner*—Kim Vu
*Assistant Examiner*—Paula Klimach
(74) *Attorney, Agent, or Firm*—Steven P. Skabrat

(57) ABSTRACT

A block cipher supporting a selectable block size of bit granularity includes a recursive Feistal network structure having a plurality of substitution boxes (S-boxes), each S-box being generated by a message digest function used as a pseudo-random number generator and one of a plurality of keys. Rather than use message digest functions as dynamic S-boxes (as in the well-known Luby-Rackoff cipher), in the present invention S-boxes may be constructed from a key at cipher build time. For larger S-boxes, a subordinate Feistal network composed of S-boxes half the size of the desired S-box may be used. Once the S-box size, N, is sufficiently small (e.g., less than 16 input bits), a permutation of integers $0 \ldots 2^N-1$ may be computed using the message digest as a cryptographic strength pseudo-random number generator (RNG) and the key. The generated integers may be used within the S-box as part of a look-up table for shuffling the input data to the S-box into encrypted output data.

27 Claims, 5 Drawing Sheets

BLOCK CIPHER FOR SMALL SELECTABLE BLOCK SIZES

BACKGROUND

1. Field

The present invention relates generally to cryptography and, more specifically, to block ciphers.

2. Description

Cryptographic ciphers can be broadly divided into stream ciphers and block ciphers. Stream ciphers encrypt a stream of data called "plaintext" into encrypted or "ciphertext" by combining the stream of plain text with a pseudo random sequence dynamically generated using a cipher key. An example of a stream cipher is the well-known RC4 cipher. Block ciphers encrypt a block of plaintext into ciphertext by applying multiple successive rounds of transformation operations to the plaintext, using a cipher key. An example of a block cipher is the well-known Data Encryption Standard (DES) cipher.

Block ciphers typically work with a small number of fixed block sizes that are convenient for hardware or software implementation. For example, the block size may be 16, 32, 48, or 64 bits. Since the size of the ciphertext is always a multiple of the block size, a single plaintext message will require at least an entire block in order for encryption and decryption to take place. While this is not a significant problem for most applications, if the cost of storing each ciphertext bit is high, a block cipher that can vary the number of bits in its block size may be useful. Additionally, performance characteristics of a block cipher may determine where the cipher may be most useful. For example, in a communications process, it may be desirable to employ a cipher with fast setup, encryption and decryption times. However, in a manufacturing process (e.g., integrated circuit manufacturing), a different cipher may be employed when a slow setup time is acceptable, encryption and decryption times are small, but the cost of storing the ciphertext is high. Existing fixed block size ciphers may not be suitable for such situations.

SUMMARY

An embodiment of the present invention is a block cipher supporting a selectable block size of bit granularity. The block cipher includes a recursive Feistal network structure having a plurality of substitution boxes (S-boxes), each S-box being generated by a message digest function used as a pseudo-random number generator and one of a plurality of keys.

Other embodiments are described and claimed.

BRIEF DESCRIPTION OF THE DRAWINGS

The features and advantages of the present invention will become apparent from the following detailed description of the present invention in which.

DETAILED DESCRIPTION

Figure 1:
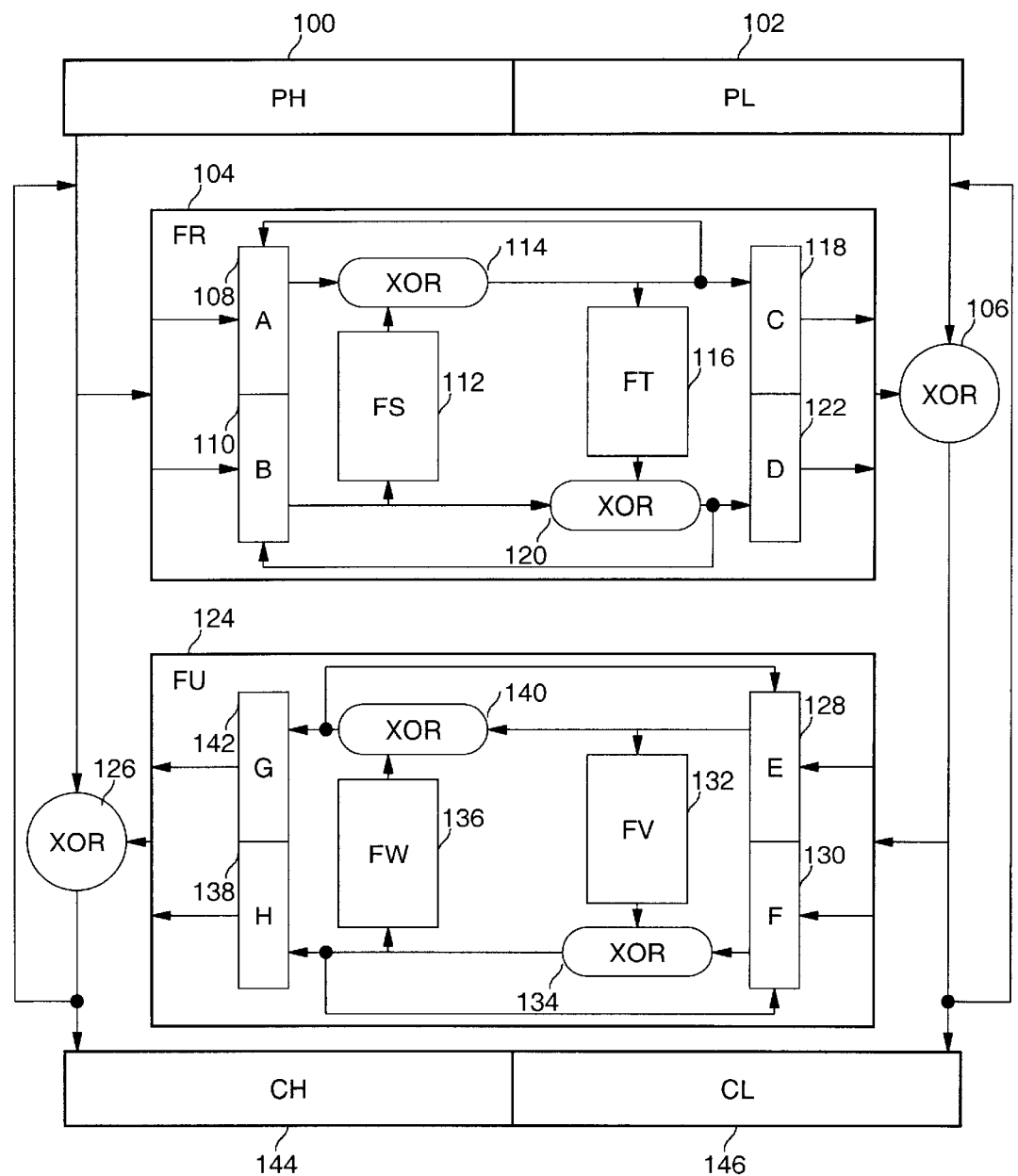
FIG. 1 is a diagram of encrypting data by a block cipher using a recursive Feistal network structure and a small variable block size according to a n embodiment of the present invention.

An embodiment of the present invention is block cipher that works with a small, variable block size with a granularity of a single bit. This feature may be especially useful in applications where a plaintext message consisting of a single block is encrypted, but the cost of storing each bit of resulting ciphertext is expensive.

I. Block Cipher Overview

As is the case for the well-known Luby-Rackoff family of block ciphers, embodiments of the present invention use a message digest function to provide the substitution effects. However, since the block size is greatly reduced in size in comparison, it instead uses the message digest function as a pseudo-random bit stream generator to create static, random, bijective, key-dependent substitution boxes (S-boxes) from an arbitrarily long key. The S-boxes are created at cipher build time (which in some cases may be part of a manufacturing process). Embodiments of the present invention use recursive Feistal networks to transform the small static substitution boxes into large, dynamic round functions. The number of rounds may be increased as desired with a proportional increase in processing time and space required for hardware implementation. The time and space increases in proportion to the logarithm of the block size selected.

Performance is highly skewed in favor of multiple message encryption or decryption speed at the expense of an extremely slow set up time (cipher build time). The bijective property of the substitution boxes and the subordinate Feistal networks may be used to prove quantifiable resistance to differential and linear cryptanalysis. In addition, the present invention deters attacks based on non-surjective round functions, which may otherwise apply to small random substitution boxes. The present invention comprises a block cipher whose substitution effects are generated by message digests with restricted inputs and truncated outputs. However, one must be careful to use at least 5 rounds to avoid a clever "birthday attack" which applies to bijective S-boxes.

An embodiment of the present invention comprises a block cipher with a variable block size to the bit granularity. In one embodiment, the present invention uses the well-known Secure Hash Algorithm (SHA-1) message digest function to generate secret substitution arrays (called "S-boxes" herein) from an arbitrary message used as the key to the cipher. Information about SHA-1 may be found in the Secure Hash Standard as disclosed in Federal Information Processing Standards Publication 180-1, Apr. 17, 1995, available on the Internet at http://www.itl.nist.gov/fipspubs/fip180-1.html. In other embodiments, other message digest algorithms may also be used.

Rather than use message digest functions as dynamic S-boxes (as in the well-known Luby-Rackoff cipher), in the present invention S-boxes may be constructed from a key at cipher build time. For larger S-boxes, a subordinate Feistal network composed of S-boxes half the size of the desired S-box may be used. Once the S-box size, N, is sufficiently small (e.g., less than 16 input bits), a permutation of integers $0 \ldots 2^N-1$ may be computed using the message digest as a cryptographic strength pseudo-random number generator (RNG) and the key. The generated integers may be used within the S-box as part of a look-up table for shuffling the input data to the S-box into encrypted output data. The resulting S-boxes are bijective (that is, key-based random permutations), as well as faster to use once they are generated, than the dynamic message digest computations of the Luby-Rackoff method. For encryption, each Feistal network may be run in the forward direction. For decryption, only the top-level network is run backwards; subordinate networks may be still run in the forward direction. In different embodiments, the invention may be used with different feedback functions to convert a message digest into a pseudo-random number generator. The function that is used to recursively create subordinate network cipher keys may be varied to produce distinct ciphers.

An advantage of embodiments of the present invention is that the block cipher described herein allows for quick encryption of arbitrary block sizes to the bit granularity. Most existing block ciphers use a block size that is a multiple of 64 bits. The present invention supports any selected block size. In one embodiment, the present cipher may be used for manufacturing operations, where the key setup time can be very long, but subsequent individual block encryption/decryption times must be fast.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

II. A Block Cipher Using Recursive Feistal Networks FIG. 1 is a diagram of encrypting data by a block cipher using a recursive Feistal network structure and a small variable block size according to an embodiment of the present invention. FIG. 1 shows a three-level implementation of the cipher. The top-level Feistal network of the recursive Feistal network structure incorporates a selected block size and a selected number of rounds. Each Feistal network in the structure may comprise other subordinate networks in a recursive manner. The block size of the cipher as well as the number of top-level rounds may be set to any number. In one embodiment having a number of top-level rounds of 16 and a block size of 30 bits or more, for example, the round functions comprise smaller subordinate Feistal networks with processing of three rounds for each subordinate network. In other embodiments, the number of rounds of the top level, the block size, and the number of rounds at various levels of subordinate networks may be different. In some embodiments, the block size of the subordinate network may be the ceiling of its parent network block size divided by two. For odd block sizes, the most significant input bit may be zero extended or the most significant output bit may be truncated when interfacing to a subordinate network.

When the block size is less than 16 bits for a given level of the recursive network, the round functions may be implemented as S-boxes instead of another subordinate Feistal network (that is, the recursion stops). Each S-box is used only once in the generated subordinate network. According to the present invention, a message digest may be used to provide a pseudo-random number generator seeded by the key. Each S-box comprises a random permutation generated by shuffling as determined by the number sequence.

Plaintext data input to the block cipher may be represented by registers denoted plaintext high (PH) 100 and plaintext low (PL) 102. PH includes approximately half of the incoming bits of a word of plaintext data (e.g., the higher bits), while PL includes the other half of the incoming bits of a word of plaintext data (e.g., the lower bits). For example, if the selected block size is 48 bits, PH holds the upper 24 bits of a block of plaintext, and PL holds the lower 24 bits of the block of plaintext. Similarly, if the selected block size is 32 bits, PH holds the upper 16 bits and PL holds the lower 16 bits of a word of plaintext data. Generally, the Feistal networks recursively divide the block size in half until it is small enough (e.g., less than 16 bits) for implementation as direct S-boxes.

The data from PH 100 may be input to pseudo random function R (FR) 104. FR may be a function that partially encrypts PH's data and outputs it for combination with PL's data by XOR function 106. Within FR 104, the PH data may be split into two halves, register A 108 and register B 110. For example, if the size of PH is 24 bits, then register A comprises the higher 12 bits of PH and register B comprises the lower 12 bits of PH. The data from register B may be input to pseudo random function S (FS) 112. FS may be a substitution array (S-box). FS partially encrypts B's data according to an embodiment of the present invention as discussed in detail below. The output data of FS may be combined with A's data by XOR function 114. This combination data may be input to another S-box, function T (FT) 116, as well as stored in register C 118. FT 116 partially encrypts its input data. The output data of FT may be combined with B's data by XOR function 120. The result of the XOR function may be stored in register D 122. FR includes a feedback mechanism wherein the data output from XOR function 114 may be fed back into register A 108 and the data output from XOR function 120 may be fed back into register B 110. Each cycle through FS and FT is called a round for the subordinate network (called FR) comprising FS and FT. In one embodiment, the number of rounds through this subordinate network may be three. For each round, different functions are used for the FS and FT S-boxes.

The data output from XOR function 106 may be input to function U (FU) 124. FR may be a function that partially encrypts PL's data and outputs it for combination with PH's data by XOR function 126. Within FU, the PL data may be split into two halves, register E 128 and register B 130. For example, if the size of PL is 24 bits, then register E comprises the higher 12 bits of PL and register F comprises the lower 12 bits of PL. The data from register E may be input to pseudo random function V (FV) 132. FV comprises a substitution array (S-box). FV partially encrypts E's data according to an embodiment of the present invention as discussed in detail below. The output data of FV may be combined with F's data by XOR function 134. This combination data is input to another S-box, function W (FW) 136, as well as stored in register H 138. FW 136 partially encrypts its input data. The output data of FW may be combined with E's data by XOR function 140. The result of the XOR function may be stored in register G 142. FU includes a feedback mechanism wherein the data output from XOR function 134 is fed back into register F 130 and the data output from XOR function 140 is fed back into register E 128. Each cycle through FV and FW is called a round for the subordinate network comprising FV and FW. The functions FV and FW are unique for each round. In one embodiment, the number of rounds through this subordinate network may be three.

The output data from XOR function 106 may be fed back into XOR 106. The output data from XOR function 126 may be fed back into FR 104 and XOR 126. Each time the data cycles through FR and FU is called a round of the top-level network (that is, an iteration through the encryption flow). In one embodiment, the number of rounds of the top-level network may be 16. After the selected number of rounds of the top-level network is performed, the resulting data may be stored as encrypted ciphertext in ciphertext high (CH) 144 and ciphertext low (CL) 146 as shown prior to output from the cipher. It should be understood that functions R and U may be similar but distinct.

As noted above, rather than use message digest functions as dynamic S-boxes, in the present invention S-boxes denoted FS 112, FT 116, FW 136, and FV 132 in FIG. 1 may be constructed from a message digest function and a unique key for each S-box (therefore each S-box is unique). The resulting random permutation S-boxes have about the same strength as random output S-boxes for their size, but the strength of the network in which they are used is the maximum strength of any S-box squared. In addition, for unbalanced networks (odd number of bits), the strength is the strength of the weakest S-box.

Figure 2:
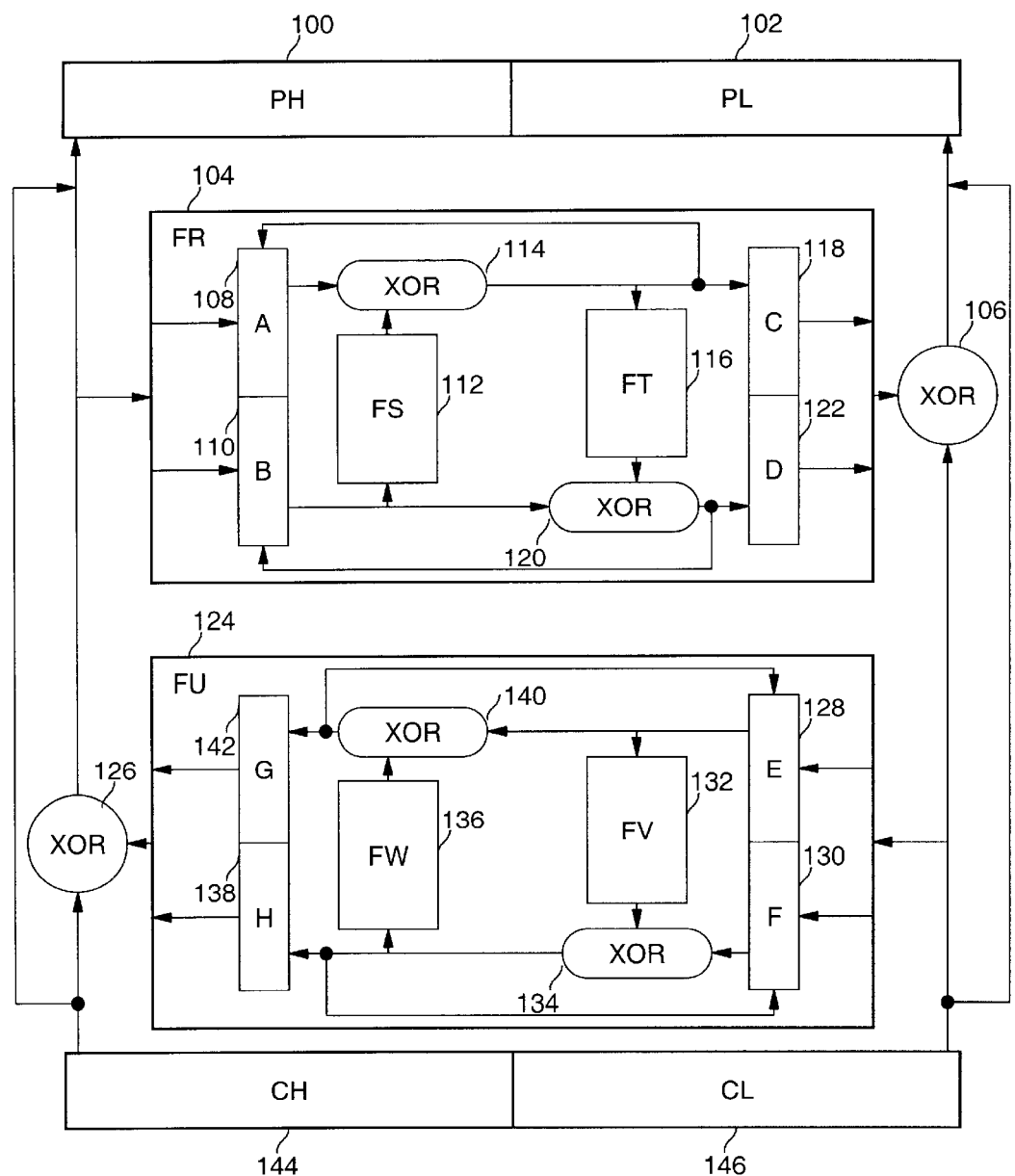
FIG. 2 is a diagram of decrypting data by a block cipher using a recursive Feistal network structure an d a small variable block size according to an embodiment of the present invention.

FIG. 2 is a diagram of decrypting data by a block cipher using recursive Feistal networks and a small variable block size according to an embodiment of the present invention. The same Feistal network combinations may be used as for encryption, but the flow of data from cipher text to plaintext may be reversed for the top-level Feistal network.

When bits are converted to numbers, "little-endian" convention may be followed. More precisely, when viewing the bits in an octet of data being processed through the cipher, bit zero is considered to be the least significant bit. The lowest address ("first") octet has the least significant 8 bits. When dividing the block size into halves, the left half will be one bit smaller than the right half when the block size is odd. The left half is the half with the lower numbered bits.

Figure 3:
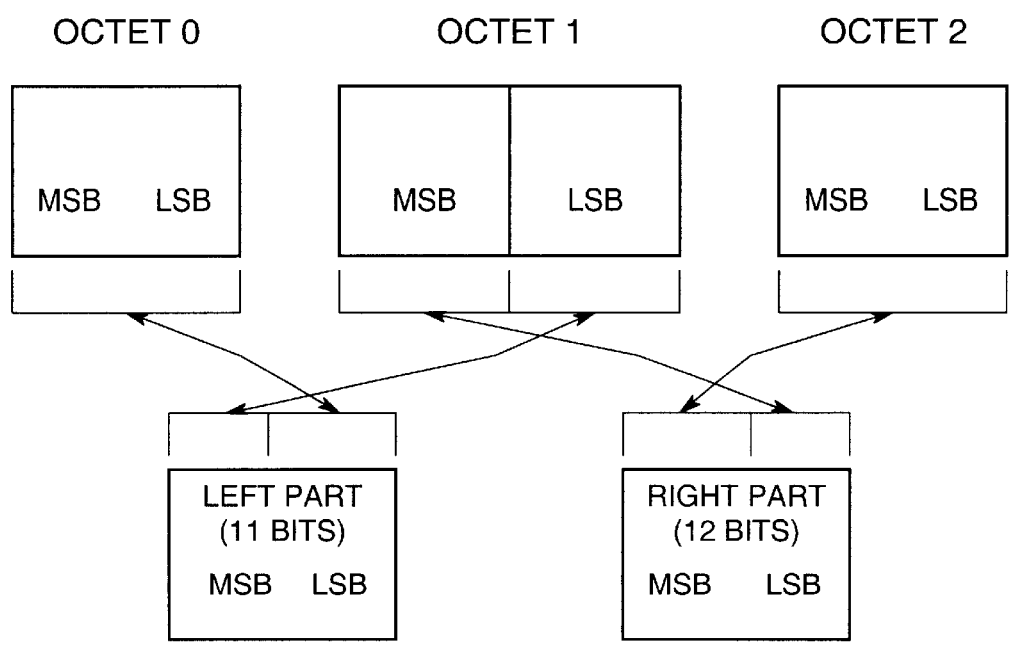
FIG. 3 is a diagram illustrating bit to integer conversion according to an embodiment of the present invention.

For example, in FIG. 3, if the block size of the cipher is 23 bits, the left part may be 11 bits long, taken from the octet with the lowest address and the least significant 3 bits from the middle octet. The right part may be 12 bits in length. It is taken from the most significant 5 bits of the middle octet, and 7 least significant bits of the octet with the highest address.

III. Subordinate Network Key Formation

Figure 4:
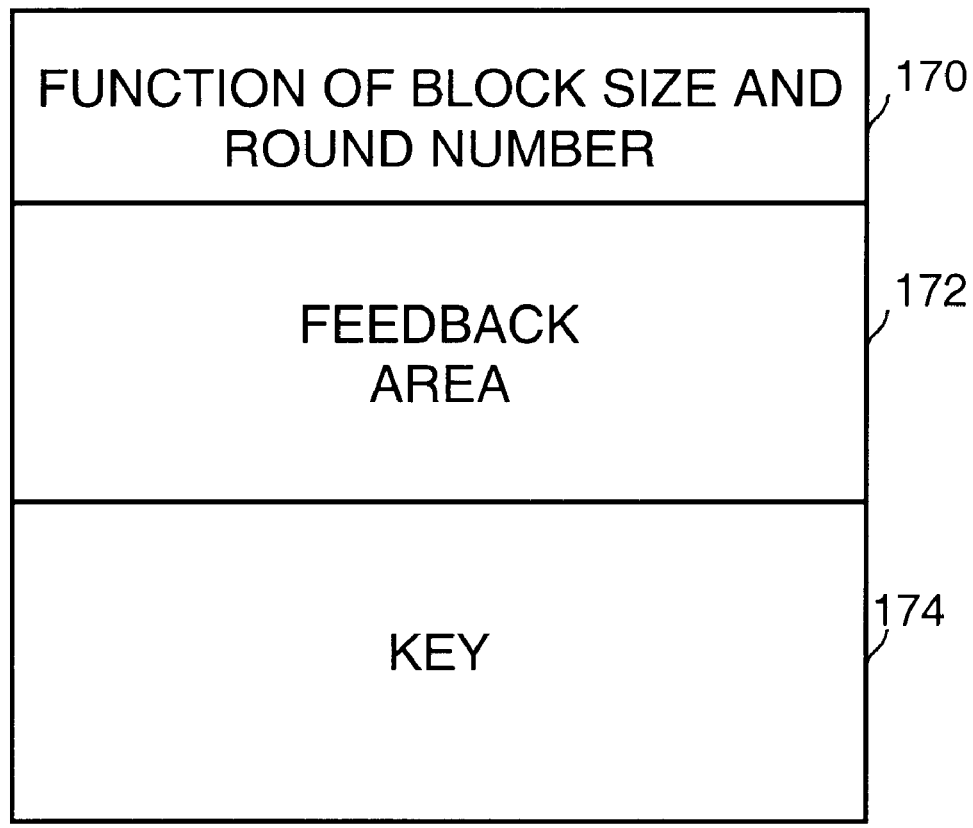
FIG. 4 is a diagram illustrating subordinate key construction according to an embodiment of the present invention.

The keys for subordinate Feistal networks in the recursive scheme may be generated in the same manner as the key for the top-level network. Each subordinate network has a distinct sub-key that may be derived according to an embodiment of the present invention by concatenating a header, a feedback area, and a parent level key, as shown in FIG. 4.

The header section 170 may be an arbitrary function of the block size, round number, subordinate network number, or other parameters. In the example shown in FIG. 4, the header section includes data that is function of the block size and the round number. The header section should be distinct for each subordinate network, so that distinct S-boxes will be generated for each subordinate network. The feedback area 172 may simply be a portion of data equal in size to the output of the message digest. The feedback area may be initialized to zero. The key 174 is the key used in processing the Feistal network that is the parent of the current network in the recursive tree structure of the present cipher.

By prepending distinct headers in this manner, it may be ensured that the subkeys for each subordinate network will be distinct. This, in turn, ensures that the S-boxes at the "leaves" of the resulting tree of Feistal networks will also be unique. Note that the keys get longer as each subordinate network in the tree structure of networks is processed.

Once the block size of the current subordinate network is sufficiently small, the header and feedback areas may be used to generate pseudo-random numbers based on the key. Data bits input to an S-box in the Feistal network may be shuffled to select one of the pseudo-random numbers generated for each S-box. The selected pseudo-random number is then output from the S-box for further processing in the network.

IV. S-Box Pseudo-Random Number Generation

At the lowest level, the S-boxes may be generated at cipher build time in order starting with S-box zero (the first S-box used in encryption). The pseudo-random state may be initially computed in a manner similar to subkey generation. A header, feedback area, and the original key are again concatenated to form the state that is fed to a message digest function.

Figure 5:
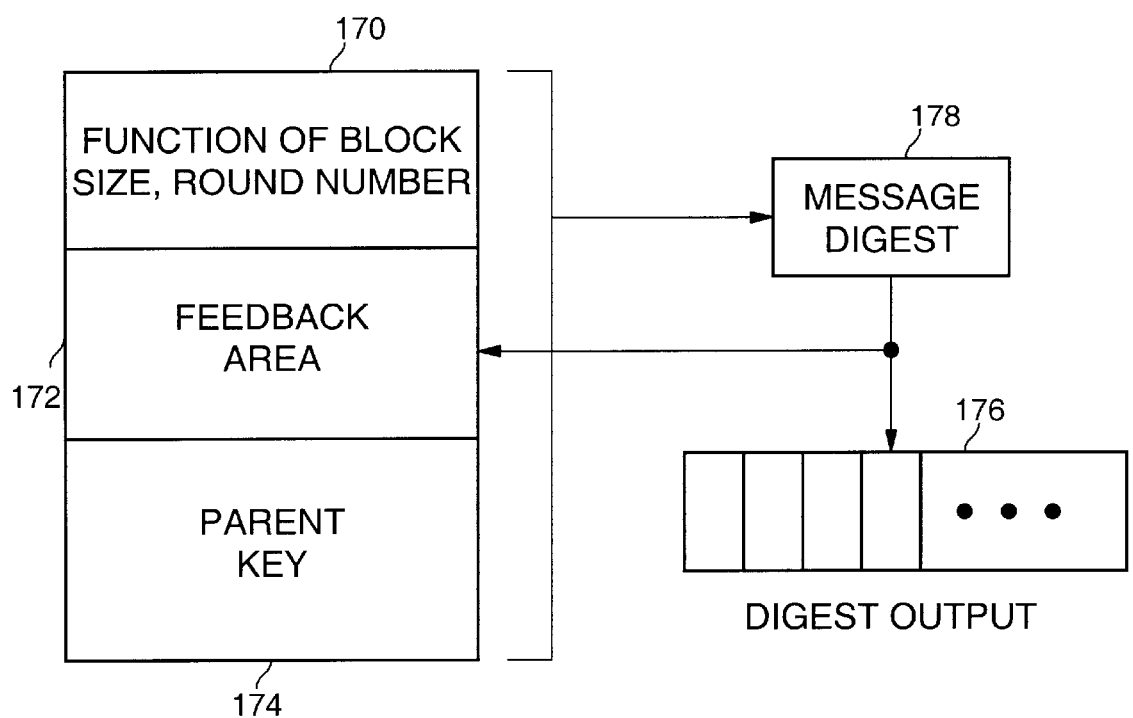
FIG. 5 is a diagram illustrating pseudo-random number generation according to an embodiment of the present invention.

FIG. 5 is a diagram illustrating pseudo-random number generation according to an embodiment of the present invention. The message digest output 176 may be viewed as a sequence of pseudo-random 16-bit (little-endian) integers produced by message digest 178. These numbers are used to "shuffle" the S-Box. When this sequence is exhausted, more numbers may be generated by copying the previous message digest output to the feedback area 172. The header section 170 in one embodiment may also be updated with a counter number (not shown) determined by the caller of the pseudo-random number generator. The message digest may then be called to provide more 16-bit integers as shown in FIG. 5.

The S-boxes may be generated in the order that they are used in encryption. As a new S-box is generated, the counter in the header may be incremented to the new S-box number, and any remaining unused 16-bit integer outputs are discarded. In other words, a message digest call may be forced at S-box boundaries.

V. S-box Generation

The N-input, N-output S-boxes are random permutations of the integers 0 to $2^N-1$ (where N is the block size measure in bits). Their generation begins by initializing each entry $S_j$ of a S-box lookup table to i. The remainder of the generation is a shuffling procedure. The shuffling successively defines lookup table entries 0 to $2^n-1$ by choosing another entry $S_j$, j>=i, to swap with entry $S_j$. As the index i increases, the available choices for j decreases: for the i'th swap, there are $2^N-i$ choices. The choice is made by calling the pseudo-random number generator with the parameter i (as described above) for storage in the header section.

The choice of the entry $S_j$ to swap is determined by taking the 16-bit pseudo-random number modulo the number of remaining choices. To ensure that all M choices have an equal chance, numbers greater than or equal to M floor $(2^{16}/M)$ are discarded, and a new pseudo-random number is taken.

In one embodiment, S-Box generation may be implemented according to the pseudo-code shown below.

```
Procedure S-Box Generation
Begin
  // Initialize
  For J = 0 to 2^N - 1 loop
    S_Box [J] = J
  End loop
  // Shuffle
  For J = 0 to 2^N - 1 loop
    loop
      // Choose "fair" value
      R = Random_Number_Generator()   // message digest output
      K = R Modulo (2^N - J)
      If R + (2^N - J - K) <= 2^16 then exit loop
    End loop
    // Exchange
    S_Box [J] < = >S_Box [J + K]
  End loop
End
```

VI. Block Cipher Parameters

The block cipher of the present invention accepts arbitrary key sizes in a granularity of an octet. Since the form of the key size is flexible, and since the key only affects the initial set-up time (which is slow in any case), key size is not performance consideration. The key size should meet or exceed general recommendations for long-term security for block ciphers. When using English language pass phrases as key material, each non-blank character counts as 3 bits. The block size should be as large as possible. This cipher is, of course, designed to work with sub-optimal block sizes. The number of rounds should be at least 5 to deter certain types of attacks. The large number of permutations for the S-boxes makes the attack impractical for block sizes of 16 bits, but nevertheless 16 rounds of the top-level network is recommended.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A block cipher comprising:
   a recursive Feistal network structure supporting a selectable block size of bit granularity and having a plurality of substitution boxes (S-boxes), each S-box being generated by a message digest function used as a pseudo-random number generator and one of a plurality of keys.

2. The block cipher of claim 1, wherein the selectable block size for the cipher comprises any number of bits greater than zero.

3. The block cipher of claim 1, wherein the recursive Feistal network structure comprises a top-level Feistal network and at least one subordinate Feistal network wherein each of the keys for generating a S-box of a subordinate Feistal network comprises at least one of a header, a feedback area, and a key from a parent Feistal network.

4. The block cipher of claim 1, wherein the S-boxes are bijective.

5. The block cipher of claim 1, wherein each Feistal network in the recursive Feistal network structure is processed in a forward direction for encryption of data.

6. The block cipher of claim 5, wherein only a top-level Feistal network of the recursive Feistal network structure is processed in a backward direction for decryption of data.

7. The block cipher of claim 1, wherein the recursive Feistal network structure comprises a lop-level Feistal network and at least one subordinate Feistal network, and wherein a number of bits input to a S-box at the subordinate Feistal network is the ceiling of the block size of the top-level Feistal network divided by two.

8. The block cipher of claim 1, wherein a number of rounds of the top-level Feistal network comprises any number greater than zero.

9. The block cipher of claim 1, wherein each S-box of the recursive Feistal network structure is unique.

10. The block cipher of claim 1, wherein the top-level Feistal network comprises a first subordinate Feistal network, a second subordinate Feistal network, a first exclusive OR function, and a second exclusive OR function, the first subordinate Feistal network being coupled to plain text data input to the block cipher and the first exclusive OR function, the second subordinate Feistal network being coupled to the first exclusive OR function, the second exclusive OR function, and ciphertext data output from the block cipher.

11. A method of implementing a block cipher comprising:
    generating a recursive Feistal network structure supporting a selectable block size of bit granularity and having a plurality of substitution boxes (S-boxes) wherein each S-box is generated by a message digest function used as a pseudo-random number generator and one of a plurality of keys.

12. The method of claim 11, wherein the selectable block size may be any number of bits greater than zero.

13. The method of claim 11, wherein generating S-boxes comprises creating static, key-dependent S-boxes having look-up tables of pseudo-random numbers generated by the message digest function.

14. The method of claim 11, wherein the S-boxes are bijective.

15. The method of claim 11, wherein each subordinate Feistal network of the recursive Feistal network structure is associated with a unique key.

16. The method of claim 15, wherein a subordinate Feistal network key comprises at least one of a header, a feedback area, and a key from a parent Feistal network.

17. The method of claim 16, wherein the header comprises at least one of a block size, a number of processing rounds, and a subordinate Feistal network number.

18. The method of claim 11, wherein the block size of a subordinate Feistal network in the recursive Feistal network structure comprises a ceiling of a block size of a parent Feistal network divided by two.

19. The method of claim 11, further comprising implementing functions of a subordinate Feistal network as S-boxes each having a unique lookup table of pseudo-random numbers generated by the message digest function when a block size of the subordinate Feistal network Is less than a predetermined number of bits.

20. A method of generating a substitution box (S-box) for a subordinate Feistal network comprising:
    obtaining a unique key for the subordinate Feistal network of a block cipher having a recursive Feistal network structure, the block cipher supporting a selectable block size of bit granularity; and
    using a message digest function and the key to generate a look-up table having a plurality of pseudo random numbers for the S-box.

21. The method of claim 20, wherein the key for the subordinate Feistal network comprises at least one of a header, a feedback area, and a key from a parent Feistal network.

22. The method of claim 21, wherein the header comprises at least one of a block size, a number of processing rounds, and a subordinate Feistal network number.

23. The method of claim 21, wherein the feedback area stores output data from the message digest function.

24. The method of claim 20, further comprising obtaining the key and using the message digest function and the key to generate the S-box when a block size of the subordinate Feistal network is less than a predetermined number of bits.

25. A method of encrypting data comprising:
    inputting plaintext data into a block cipher, the block cipher supporting a selectable block size of bit granularity, the block cipher having a recursive Feistal network structure having a plurality of substitution boxes (S-boxes), each S-box being generated at cipher build time by a message digest function used as a pseudo-random number generator and one of a plurality of keys; and
    outputting ciphertext data resulting from processing the plaintext data by a plurality of rounds of the recursive Feistal network structure.

26. A method of decrypting data comprising:
    inputting ciphertext data into a block cipher, the block cipher supporting a selectable block size of bit granularity, the block cipher having a recursive Feistal network structure having a plurality of substitution boxes (S-boxes), each S-box being generated at cipher build time by a message digest function used as a pseudo-random number generator and one of a plurality of keys; and
    outputting plaintext data resulting from processing the ciphertext data by a plurality of rounds of the recursive Feistal network structure.

27. The method of claim 26, wherein only a top-level Feistal network of the recursive Feistal network structure is processed in a backward direction.

* * * * *